Figure 1:
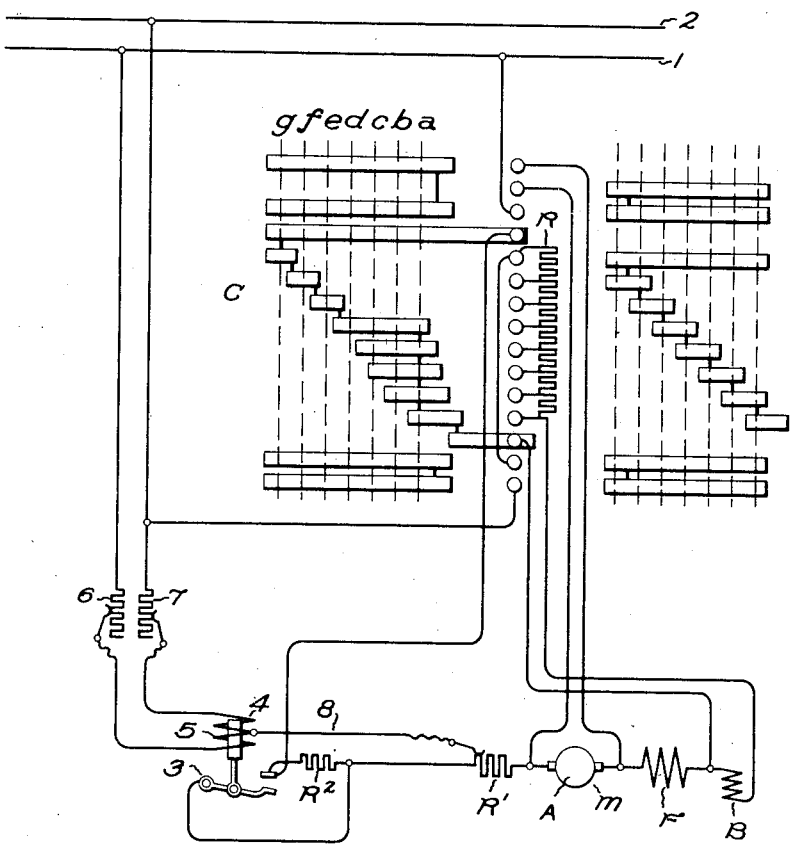

R. H. McLAIN AND J. EATON.
MOTOR CONTROL SYSTEM.
APPLICATION FILED JUNE 29, 1916.

1,306,548.

Patented June 10, 1919.
2 SHEETS—SHEET 1.

Inventors:
Robert H. McLain,
John Eaton,
by Albert G. Davis
Their Attorney.

R. H. McLAIN AND J. EATON.
MOTOR CONTROL SYSTEM.
APPLICATION FILED JUNE 29, 1916.
1,306,548.
Patented June 10, 1919.
2 SHEETS—SHEET 2.
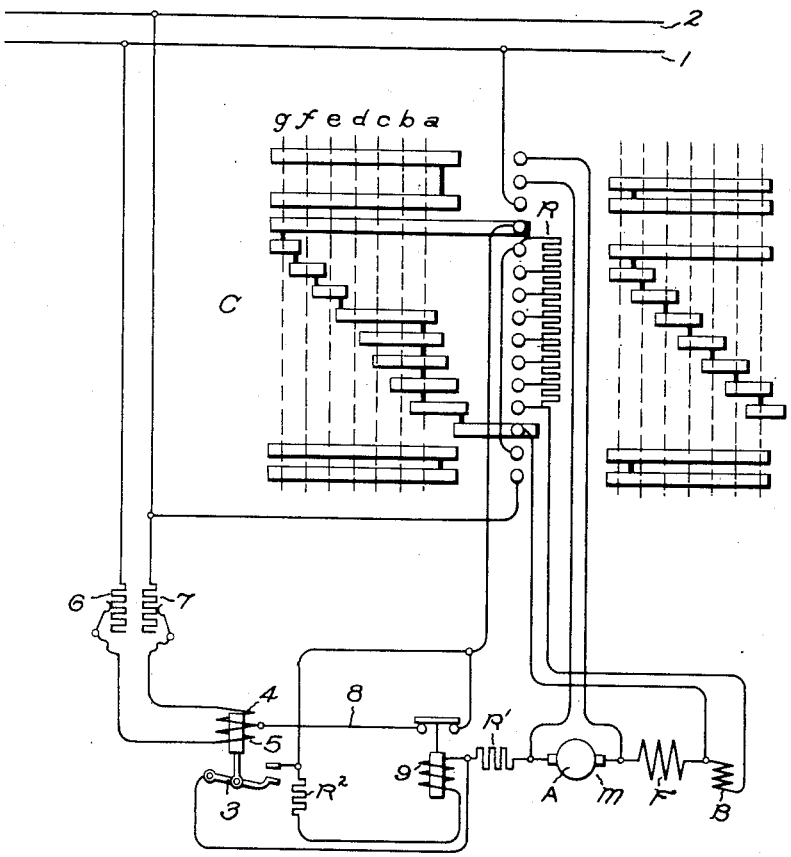
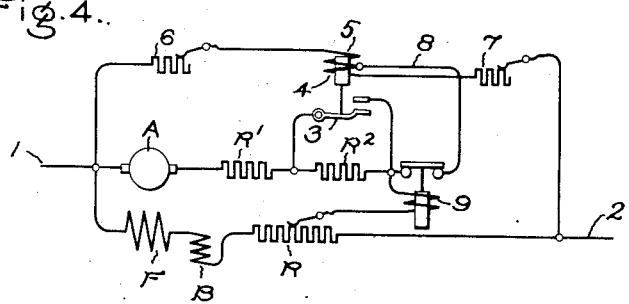
Inventors:
Robert H. McLain,
John Eaton,
by John G. Davis
Their Attorney

UNITED STATES PATENT OFFICE.

ROBERT H. McLAIN AND JOHN EATON, OF SCHENECTADY, NEW YORK, ASSIGNORS TO GENERAL ELECTRIC COMPANY, A CORPORATION OF NEW YORK.

MOTOR-CONTROL SYSTEM.

1,306,548.        Specification of Letters Patent.        Patented June 10, 1919.

Application filed June 29, 1916. Serial No. 106,709.

*To all whom it may concern:*

Be it known that we, ROBERT H. MCLAIN, a citizen of the United States, and JOHN EATON, a subject of the King of Great Britain, residing at Schenectady, county of Schenectady, State of New York, have invented certain new and useful Improvements in Motor-Control Systems, of which the following is a specification.

Our invention has reference to the control of electric motors, and has for its object the provision of means whereby the motor may be started, stopped, and in general controlled in a reliable and efficient manner.

Our invention is particularly applicable to motors intended for reversing, such as are used in hoisting, and it provides means for securing proper speed-torque characteristics for the motor, at the same time protecting the motor, the control apparatus and the supply conductors from excessive rushes of current when it is attempted to accelerate or retard the motor too quickly.

In controlling a reversible motor for hoisting purposes, it is common practice in lowering to connect a resistance in shunt to the armature so that a high speed in lowering may be obtained but the speed will be safely limited in case the load should overhaul the motor. Where a series motor is used, it is common practice to provide a controller having a plurality of circuit-making contacts for operating the motor as a series motor to raise a comparatively heavy load and controlling the speed by means of a variable resistance in the motor circuit. The load on the motor in lowering is usually considerably lighter than the load in hoisting, and it is customary to reverse the motor by reversing the relation of the armature and series field, and at the same time to connect the series field with a resistance in circuit in shunt to the armature to permit an increased speed in lowering. If the load should overhaul the motor, the motor would then operate as a generator, causing a current to flow through the local dynamic braking circuit and thereby limiting the lowering speed to a safe value. The variable resistance which had previously been used to accelerate the motor during hoisting is also used for varying the motor speed during lowering. When the field and armature are placed in parallel circuits for lowering, it is customary to include a permanent resistance of low value in the armature circuit to obtain proper speed-torque characteristics for the motor if the motor does not itself have those characteristics inherently. However, if this permanent resistance is of a value to give the desired proper speed-torque characteristics for the motor, it will not be sufficient to protect the armature circuit from excessive rushes of current when the controller is turned rapidly, and if it is of such a value to properly protect the armature circuit from excessive rushes of current, it will be too great to give proper speed-torque characteristics. If this resistance is of such a value to give proper motor speed-torque characteristics, or if the motor had those characteristics without the permanent resistance, in case the operator should move the controller handle too quickly to either accelerate or retard the motor, an excessive rush of current is caused which causes sparking at the commutator, heating of the motor coils, destructive arcing at the controller contacts, and if the motor is being accelerated, a great rush of current from the supply circuit. If this resistance is of a sufficient value to protect the armature circuit in case the operator moved the controller handle too quickly in either direction, the armature circuit would be protected at the sacrifice of the best speed-torque operating characteristics for the motor. By our invention, we secure the advantages of a resistance in the armature circuit of such a value to protect this circuit when it needs protection and also secure the advantages of proper speed-torque characteristics for the motor during the period of operation when the armature circuit does not need protection. In one form of our invention, we provide in the armature circuit, in addition to the permanent resistance (if such is required) which is ordinarily included in this circuit during lowering to give the desired speed-torque characteristics, a second resistance of such a value that either alone or with the permanent resistance, the armature circuit will be protected from excessive rushes of current when the controller is moved to vary the speed of the motor. The arrangement is such that the second resistance will be automatically short-circuited at the proper time depending on the speed of the motor and the current in the armature circuit. With this arrangement the operator can move the controller handle directly and quickly from any lowering position to any other lowering position or from any lowering position to the "off" position or first point hoisting position without injuring the motor or the controller or taking an excessive current from the source of supply or causing an excessive current to flow through the motor circuit; at the same time, proper motor speed-torque characteristics are secured during normal operation. In one form of our device we provide an electromagnetically-actuated switch controlled jointly by the controller and the counter electromotive force of the motor for varying the resistance in the armature circuit to obtain the desirable features above outlined. This electromagnetically-actuated switch preferably has a coil composed of two differentially wound sections so that in case the ampere turns in the two sections are substantially equal, the two sections neutralize each other and the switch is prevented from closing, but in case the ampere turns of either one of the sections is sufficiently greater than that of the other section the switch will close and short circuit this second resistance in the armature circuit. In case the ampere turns of the two sections should later become substantially equal the switch will open and remove the short circuit. This switch operates responsively to the counter electromotive force of the motor and the ampere turns in the two sections are varied by the movement of the controller. In another form of our invention instead of having the operation of the switch depend upon the counter electromotive force of the motor, we have it operated by a shunt coil controlled by the motor current. This arrangement has the advantage that the closing of the switch is not affected by changes in line voltage or heating of the coil of the switch. The operation of our device is positive at all times, and the arrangement is such that the troublesome interlocks, which are commonly provided in systems of motor control for causing a desired progression of operation of a plurality of electromagnetically actuated switches, are eliminated. None of these troublesome interlocks are necessary in our arrangement.

Figure 2:
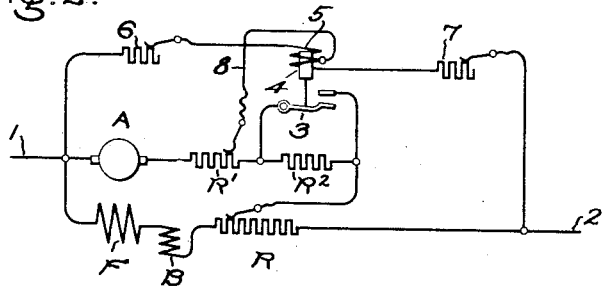

Referring to the drawings, Figure 1 shows a diagram of connections for an electric motor embodying one form of our invention; Fig. 2 is a simplified diagram of the circuits of Fig. 1 when the motor is connected to lower a load; Fig. 3 is a diagram of circuits for an electric motor embodying another form of our invention, and Fig. 4 is a simplified diagram of connections of the system shown in Fig. 3 when the motor is connected to lower a load.

Referring to Fig. 1, the reversible series motor $m$, which I have shown for purpose of illustration, having an armature A and a series field F, receives current from the supply conductors 1 and 2 through the controller C which is adapted to make the various changes in the motor circuits for operating the motor to hoist or lower a load or dynamically braking the motor as desired. The motor is adapted to operate as a series motor for hoisting a load but for lowering a load the field is connected in shunt to the armature thus including the armature in a local dynamic braking circuit. In the "off" or neutral position of the controller C the motor M is disconnected from the supply circuit 1, 2 and connected in a local dynamic braking circuit with the coil B of the electromagnetically actuating brake (not shown) deënergized so that the brake is applied to assist in bringing the motor to rest. The controller C is used for increasing or decreasing the motor speed for both hoisting and the lowering operations of the motor. When the controller C is moved to the right, the motor is connected in the proper relation for lowering a load. A part of the resistance R is connected in series with the motor, and the field with a part of the resistance R in series is connected in shunt to the armature. In the lowering positions of the controller the permanent resistance R' is included in the armature circuit in cases where the motor does not itself have inherently the proper speed-torque characteristics for lowering, and it is of such a value that the proper speed-torque characteristics for the motor may be obtained during the normal operation of the motor in lowering. The resistance $R^2$ is also included in the armature circuit, and the resistances $R^1$ and $R^2$ together make a total resistance of such a value that the armature circuit is protected from excessive rushes of current in case the controller C be moved too quickly from any one of the lowering positions to any other of the lowering positions or from any one of the lowering positions to the "off" position. The electromagnetically actuated switch 3 is adapted to short circuit the resistance $R^2$ after this protective resistance is no longer necessary. This resistance $R^2$ is of the proper value for the particular service to which the motor is applied. The electromagnetically actuated switch 3 has a coil composed of two differentially wound sections 4 and 5 of substantially equal number of turns. This coil receives energy from the supply conductors 1 and 2 and is responsive to the counter electromotive force of the motor. In each of the supply wires for the coil there is placed variable resistances 6 and 7 respectively. The middle point of the coil between the two differentially wound sections 4 and 5 is connected to the resistance R′ by an adjustable connection 8 in order to adapt the coil to the particular service for which the motor M is intended.

The operation of this system is as follows:

If it is desired to hoist a load the controller C is moved to the left, thus connecting the motor m as a series motor with the brake coil B and the resistance R in the motor circuit. The brake coil being energized, the brake (not shown) is released and the motor is free to rotate. By moving the controller C through the successive operative positions the resistance R is gradually short circuited, thus increasing the motor speed until in the final position the resistance R is all cut out of the motor circuit and the motor is operating as a series motor connected across the supply conductors 1 and 2 with the brake coil B in series. In order to stop the motor, the controller is moved backward to the "off" position when the motor is disconnected from the supply conductors with the coil B deënergized and the brake applied.

In order to lower a load, the controller is moved to the right through the successive positions $a$ to $g$. The connections of the motor for lowering are shown in the simplified diagram, Fig. 2. It will be noticed that the differentially wound coil of the electro-magnetically actuated switch 3 is now connected so as to be responsive to the counter electromotive force of the motor by means of the conductor 8 which connects the intermediate point between the two differentially wound sections 4 and 5 to the proper point on the resistance R′. The field F having the brake coil B and a portion of the resistance R connected in series is connected in shunt to the armature circuit. The permanent resistance R′ and the resistance $R^2$ are included in the armature circuit in order to protect this circuit in case the controller C should be moved too quickly from the "off" position to any one of the operative positions, or from any one of the operative positions to any other of the operative positions or from any one of the operative positions to the "off" position during lowering. In case, for instance, the operator should move the controller C directly and quickly from the "off" position to position $d$, the section 5 of the differentially wound coil of switch 3 would be shunted by the armature A and a portion or all of the resistance R′, as the case may be, and the voltage applied to this coil section would be the drop across this shunt circuit. The coil section 4 would be shunted by the resistance $R^2$ and so much of the resistance R which is in series with the motor circuits and the voltage applied to this coil would be the drop across this shunt circuit. The ampere turns in the two coil sections 4 and 5 would not necessarily be equal, but the difference would not be sufficiently great for either one of the coil sections to preponderate over the other and thus close the switch. The armature circuit is therefore protected against excessive rushes of current by the permanent resistance R′ and the resistance $R^2$. After the armature starts and gradually increases in speed, the counter electromotive force of the armature correspondingly gradually increases and the voltage applied to the coil section 5 thus gradually increases. At the same time the voltage applied to the coil section 4 gradually decreases because the current in the armature circuit gradually lowers as the speed increases. The difference in the ampere turns of the two coil sections eventually becomes so different in value that the coil section 5 preponderates over the coil section 4 to such an extent that the coil section 5 is permitted to close the switch 3 and thus short circuit the resistance $R^2$. It will be seen that this resistance $R^2$ remains in the armature circuit until the speed and the counter electromotive force of the motor increases to such an extent that the protection of the resistance $R^2$ is not necessary for the armature circuit. The permanent resistance R′ is then left in the armature circuit, and as before stated it is of such a value that the speed-torque characteristics are obtained which it is desired that the motor shall have during normal operation. The differentially wound coil of switch 3 is adjustably connected to the resistances 6, 7, and R′ in order that the coil may be adapted to close the switch 3 when the motor has reached the speed at which it is desired that the resistance $R^2$ be short circuited. As the controller C varies the resistance R, it varies the relative number of ampere turns in the two coil sections. The adjustable resistances 6 and 7 therefore permit the differentially wound coil to be adjusted for closing the switch 3 at a different armature current for the motor when the speed is increasing than when it is decreasing. In case the controller C were merely moved to the first position $a$, the protection of the resistance $R^2$ would not be necessary for the armature circuit and the difference in the ampere turns of the two coil sections would be such that the switch 3 would be caused to close. If the controller C were always moved slowly from the "off" through the successive operative positions, the resistance $R^2$ would not be necessary to protect the armature circuit from excessive rushes of current, and it is only in cases when the controller is moved quickly thus causing an excessive current to flow through the armature circuit that the resistance $R^2$ is necessary. It will be seen that our device automatically takes care of this protection for the armature circuit.

Let us assume that the controller has been moved to the position $g$, the last operative position for lowering and that the switch 3 had been operated to short circuit the resistance R² for the normal running of the motor in lowering and it is desired to decrease the speed of the motor by moving the controller backward to the "off" position. If the controller were moved quickly from the position $g$ to any one of the other positions in lowering, say for instance the position $d$, an excessive rush of current would be caused in the armature circuit due to the regenerative action of the motor which would then operate as a generator causing current to flow through the local dynamic braking circuit. When this happens the ampere turns in the two coil sections due to the changed position of the controller and the change in the counter electromotive force of the motor would be of such values that neither one of the coil sections would preponderate over the other to such an extent that the switch 3 would be maintained in the closed position. The switch 3 is thus in any event caused to positively open when the controller is moved backward from the full lowering to the "off" position due to the change in the relative number of ampere turns in the two coil sections and to the fact that the two sections at some one of the positions of the controller will completely neutralize each other and there will be no magnetic flux to maintain the switch closed.

Referring to Figs. 3 and 4, it will be seen that the system of control there shown is the same with the exception that instead of having a winding responsive to the counter electromotive force of the motor the winding is across the line and is controlled by the motor current. Similar reference characters in all the figures indicate the same devices. This current limit relay is adapted to effect a change in the relative number of ampere turns in the two coil sections by completing the circuit from the intermediate point between the two coil sections 4 and 5 to the proper point in the armature circuit. The operation of this system is substantially the same as that of the system shown in Figs. 1 and 2, but in this case if the controller be moved quickly from the "off" to any one of the lowering positions so as to cause the motor to take an excessive amount of current, the resistance R² can not be short circuited from the armature circuit until the current has dropped to a predetermined value after which the switch 3 is adapted to be closed by one of the coil sections responsively to the counter electromotive force of the armature and the movement of the controller C varying the resistance R. The ampere turns in the coil sections 4 and 5 of the switch 3 in both the systems of Figs. 1 and 3, are effected jointly by the movement of the controller C varying the resistance R and the counter electromotive force of the motor. In the system shown in Fig. 3 the variation of the ampere turns in the two coil sections is also responsive to the armature current because of the current limit relay 9 which completes the circuit to the intermediate point between the two coil sections after the armature current has dropped to a predetermined value. In both forms of our invention the controller is protected from burning at the contact segments when it is moved quickly from the full lowering to the "off" or the first hoisting position, because of the protective action of the resistance R² in limiting the armature current. It will be seen that in the above forms of our invention the electromagnetically actuated switch is caused to positively close at the proper interval when the controller is moved through the lowering positions, and that the switch is caused to positively open when the controller is moved from any one of the operative positions in lowering to the "off" position. The operation of the electromagnetically actuated switch 3 and the current limit relay 9 is effected without the use of the troublesome interlocks which are ordinarily included in systems of control to secure a successive operation of a plurality of the electromagnetically actuated switches.

What we claim as new and desire to secure by Letters Patent of the United States, is,—

1. The combination with an electric motor having a series field, of a controller for connecting the motor to a source of supply with the series field and armature in shunt circuits, and means for automatically varying the resistance of the shunt circuit in which the motor armature is included, responsively to the counter electromotive force of the motor armature.

2. The combination with an electric motor having a series field, of a controller for connecting the motor to a source of supply with the series field and armature in shunt circuits, and means for automatically varying the resistance of the shunt circuit in which the motor armature is included, responsively to the current in the motor armature circuit.

3. The combination with an electric motor having a series field, of a controller for connecting the motor to a source of supply with the series field and armature in shunt circuits, and means for automatically varying the resistance of the shunt circuit in which the motor armature is included, responsively to the counter electromotive force of the motor armature and the current of the motor armature circuit.

4. The combination with a series motor and a source of supply therefor, of a controller for connecting the motor to the source of supply with the series field and armature in a dynamic braking circuit, and means whereby the resistance of the dynamic braking circuit is automatically increased if the current in said circuit rises above a safe value when the controller is moved from an operative toward the "off" position.

5. The combination with a series motor and a source of supply therefor, of a controller for connecting the motor to the source of supply with the series field and armature in a dynamic braking circuit, and means for automatically increasing the resistance of the dynamic braking circuit if the current in said circuit rises above a safe value when the controller is moved to either increase or decrease the motor speed.

6. The combination with a series motor and means for reversing the same, of connections whereby the field winding is connected in shunt to the armature circuit for one direction of rotation to form a dynamic brake circuit, a resistance in said circuit and an electromagnetic switch controlled by the speed of the motor for controlling said resistance.

7. The combination with an electric motor and means for reversing the same, of a resistance arranged to be connected in the armature circuit to form a dynamic brake circuit when the reversing means is operated to cause the motor to operate in one direction of rotation, and an electromagnetic switch controlled by the speed of the motor for controlling said resistance.

8. The combination with an electric motor and means for reversing the same, of a resistance arranged to be connected in the armature circuit for one direction of rotation to form a dynamic brake circuit, an electromagnetic switch for controlling said resistance, and connections whereby said switch will automatically operate to short circuit the resistance whether the motor is operating as a motor or as a generator only when the armature current is below a safe value.

9. The combination with an electric motor and means for reversing the same, of a resistance arranged to be connected in the armature circuit for one direction of rotation to form a dynamic brake circuit, and an electromagnetic switch responsive jointly to dynamic braking current and motor speed for automatically short circuiting a resistance only when the armature current is below a safe value.

10. The combination with an electric motor and means for reversing the same, of a resistance arranged to be connected in the armature circuit to form a dynamic brake circuit when the reversing means is operated to cause the motor to operate in one direction of rotation, and an electromagnetic switch for short circuiting the said resistance having differential windings, one of which is controlled by the speed of the motor and the other by the dynamic braking current.

11. The combination with an electric motor and a controller for reversing and varying the motor speed, of a resistance arranged to be connected in the armature circuit for one direction of rotation to form a dynamic brake circuit, a switch for controlling said resistance, and connections whereby said switch will automatically operate to short circuit the resistance provided the armature current is below a safe value when the controller is operated to increase the motor speed and said switch will automatically open to reinsert said resistance provided the armature current is greater than a safe value when the controller is operated to lower the motor speed.

12. The combination with an electric motor and a reversing controller therefor having means for connecting the armature and field winding in series for one direction of rotation and the armature and a protective resistance in parallel with the field winding and a variable resistance in series with the parallel circuits for the other direction of rotation, of an electromagnetically actuated switch for controlling the protective resistance, and connections whereby moving the controller in one direction gradually includes the variable resistance in the field winding circuit and causes the said switch to automatically short circuit the protective resistance provided the armature current is below a safe value, and moving the controller to remove the variable resistance from the field winding circuit causes the said switch to automatically reinsert the protective resistance in the armature circuit.

13. The combination with an electric motor having a series field, of means for connecting the motor to a source of supply with the series field and armature in shunt circuits, a permanent resistance in the armature circuit to obtain the desired speed torque characteristics for the motor, and a second resistance in the armature circuit controlled by means responsive to the counter electromotive force of the motor for protecting the armature circuit from excessive rushes of current.

14. The combination with an electric motor having a series field, of means for connecting the motor to a source of supply with the series field and armature in shunt circuits, of a permanent resistance in the armature circuit to obtain the desired speed-torque characteristics for the motor, and a second resistance in the armature circuit controlled by means responsive to the armature current for protecting the armature circuit from excessive rushes of current.

15. The combination with an electric motor, of a permanent resistance in the armature circuit to obtain the desired speed-torque characteristics for the motor, and a second resistance in the armature circuit controlled by means responsive to the counter electromotive force of the motor and the current in the armature circuit to protect the armature circuit from excessive rushes of current.

16. The combination with an electric motor and a controller therefor, of a permanent resistance in the armature circuit to obtain the desired speed-torque characteristics for the motor, and a second resistance in the armature circuit controlled by the controller and by means responsive to the current in the armature circuit and the counter electromotive force of the motor to protect the armature circuit from excessive rushes of current.

17. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit controlled jointly by the controller and by means responsive to the counter electromotive force of the motor to protect the armature circuit from excessive rushes of current.

18. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit to protect this circuit from excessive rushes of current, and means for automatically short circuiting this second resistanuce as the controller is moved to vary the motor speed.

19. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit to protect this circuit from excessive rushes of current, and means controlled jointly by the controller and the counter electromotive force of the motor for short circuiting this second resistance.

20. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit to protect this circuit from excessive rushes of current, and means for automatically short circuiting this second resistance as the controller is moved to increase the motor speed and for removing the short circuit as the controller is moved to decrease the motor speed.

21. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit to protect this circuit from excessive rushes of current, and an electromagnetically actuated switch for automatically short circuiting this second resistance as the controller is moved to vary the motor speed.

22. The combination with an electric motor having a series field and a controller for connecting the motor to a source of supply with the series field and armature in shunt circuits, of a permanent resistance in the armature circuit to obtain the desired speed-torque characteristics for the motor, a second resistance in the armature circuit to protect this circuit from excessive rushes of current, and an electromagnetically actuated switch controlled jointly by the controller and the counter electromotive force of the motor for short circuiting this second resistance as the controller is moved to increase the motor speed and for removing the short circuit as the controller is moved to decrease the motor speed.

23. The combination with a series motor and a controller for connecting the field in shunt and a permanent resistance in series with the armature for one direction of operation, of a second resistance in the armature circuit, and means including an electromagnetically operated switch for automatically short circuiting this second resistance after the armature current drops to a predetermined value during acceleration and automatically removing the short circuit during retardation of the motor speed.

24. The combination with an electric motor and a controller for varying the motor speed, of a resistance in the armature circuit, an electromagnetically actuated switch for short circuiting the resistance, a coil for said switch having two sections, each of which is adapted to prevent the other from closing the switch, and means whereby one of the coil sections is permitted to close the switch as the controller is moved to vary the motor speed.

25. The combination with an electric motor and a controller for varying the motor speed, of a resistance in the armature circuit, an electromagnetically actuated switch for short circuiting the resistance, a coil for said switch having two sections, each of which is adapted to prevent the other from closing the switch, and means whereby one of the coil sections is permitted to close the switch as the controller is moved to increase the motor speed and the switch caused to open as the controller is moved to decrease the motor speed.

26. The combination with an electric motor having a resistance in the armature circuit, of an electro-magnetically actuated switch for short circuiting the resistance, a coil for said switch having two sections, each of which is adapted to prevent the other from closing the switch, and means controlled by the armature current for permitting one of the sections to close the switch and short circuit the resistance.

27. The combination with an electric motor and a controller therefor having means for connecting the field winding and the armature in parallel, of a resistance in the armature circuit, an electromagnetically actuated switch for short circuiting the resistance, a coil for said switch having two differentially wound sections, each of which is adapted to prevent the other from closing the switch, and means controlled by the armature current for shunting one of the coil sections to permit the other section to close the switch and short circuit the resistance.

28. The combination with an electric motor having a resistance in the armature circuit, of an electromagnetically actuated switch for short circuiting the resistance, a coil for said switch having two differentially wound sections, one of which is connected in shunt to the armature and each of the sections adapted to prevent the other from closing the switch, and means for permitting one of the sections to close the switch.

29. The combination with an electric motor, of a resistance in the armature circuit, an electromagnetically actuated switch for short circuiting the resistance, a coil for said switch responsive to the counter electromotive force of the motor and having two differentially wound sections, each of which is adapted to prevent the other from closing the switch, and means responsive to the armature current for shunting one of the coil sections to permit the other to close the switch.

30. The combination with an electric motor, of a resistance in the armature circuit, an electromagnetically actuated switch for short circuiting the resistance, a coil for said switch responsive to the counter electromotive force of the motor and having two differentially wound sections, each of which is adapted to prevent the other from closing the switch, an independent variable resistance in the circuit of each coil section, and means for permitting one of the sections to close the switch.

31. The combination with an electric motor having a permanent resistance in the armature circuit, an electromagnetically actuated switch for short circuiting the second resistance, a coil for said switch responsive to the counter electromotive force of the motor and having two differentially wound sections, each of which is adapted to prevent the other from closing the switch, an independent variable resistance in the circuit of each coil section, and means controlled by the armature current for permitting one of the coil sections to close the switch.

In witness whereof, we have hereunto set our hands this 28th day of June, 1916.

ROBERT H. McLAIN.
JOHN EATON.